United States Patent
Li et al.

(10) Patent No.: US 12,030,992 B2
(45) Date of Patent: Jul. 9, 2024

(54) PHOTOCURABLE COMPOSITION

(71) Applicant: CANON KABUSHIKI KAISHA, Tokyo (JP)

(72) Inventors: Fei Li, Austin, TX (US); Weijun Liu, Cedar Park, TX (US)

(73) Assignee: CANON KABUSHIKI KAISHA, Tokyo (JP)

( * ) Notice: Subject to any disclaimer, the term of this patent is extended or adjusted under 35 U.S.C. 154(b) by 851 days.

(21) Appl. No.: 16/728,116

(22) Filed: Dec. 27, 2019

(65) Prior Publication Data

US 2021/0198400 A1  Jul. 1, 2021

(51) Int. Cl.
| | | |
|---|---|---|
| *C08G 73/06* | (2006.01) | |
| *C08F 212/32* | (2006.01) | |
| *C08F 220/18* | (2006.01) | |
| *C08F 220/20* | (2006.01) | |
| *C09D 7/63* | (2018.01) | |
| *C09D 11/101* | (2014.01) | |
| *C09D 11/30* | (2014.01) | |
| *C09D 133/06* | (2006.01) | |
| *C08G 73/00* | (2006.01) | |

(52) U.S. Cl.
CPC .......... *C08G 73/06* (2013.01); *C08F 212/32* (2013.01); *C08F 220/1807* (2020.02); *C08F 220/1811* (2020.02); *C08F 220/20* (2013.01); *C09D 7/63* (2018.01); *C09D 11/101* (2013.01); *C09D 11/30* (2013.01); *C09D 133/06* (2013.01); *C09D 133/062* (2013.01); *C08G 73/00* (2013.01)

(58) Field of Classification Search
CPC ... C08G 73/06; C08G 73/00; C08F 220/1807; C08F 220/1811; C08F 212/32; C09D 11/101; C09D 11/102; C09D 11/30; C09D 133/06; C09D 133/062
See application file for complete search history.

(56) References Cited

U.S. PATENT DOCUMENTS 6,620,905 B1 * 9/2003 Musa .................. C07D 265/16
                                                                525/203
7,097,959 B1 * 8/2006 Ryu ........................ G03F 7/033
                                                                430/280.1
(Continued)

FOREIGN PATENT DOCUMENTS

| CN | 105308506 A | 2/2016 |
|---|---|---|
| JP | 2003-344996 A | 12/2003 |

(Continued)

OTHER PUBLICATIONS

Monument Chemical, "Propylene Glycol Mono Methyl Ether Acetate (PMAc)" Oct. 29, 2021 Published online at https://monumentchemical.com/uploads/files/TDS/PMAC_TDS.pdf?v=1635378674546 (Year: 2021).*

*Primary Examiner* — Ling Siu Choi
*Assistant Examiner* — David L Miller
(74) *Attorney, Agent, or Firm* — Abel Schillinger, LLP

(57) ABSTRACT

A photocurable composition can comprise a polymerizable material and an initiator. The polymerizable material can comprise at least one 1,3-benzoxazine monomer and at least one acrylate monomer, and may have a viscosity of not greater than 20 mPa·s. The photocurable composition can be suitable for use in inkjet adaptive planarization and is adapted to form cured layers having exceptional heat stability up to 320° C.

14 Claims, 1 Drawing Sheet

(56) References Cited

U.S. PATENT DOCUMENTS

| | | | |
|---|---|---|---|
| 7,279,506 | B2 | 10/2007 | Sisler |
| 7,815,303 | B2 | 10/2010 | Kasai |
| 10,023,698 | B2 | 7/2018 | Gorodisher |
| 10,040,905 | B2 | 8/2018 | Gorodisher |
| 2012/0259042 | A1* | 10/2012 | Potisek ................. C08L 33/18 525/122 |
| 2016/0369040 | A1 | 12/2016 | Das |
| 2021/0024762 | A1 | 1/2021 | Nakashima |

FOREIGN PATENT DOCUMENTS

| | | | | |
|---|---|---|---|---|
| JP | 2005329713 | A | 12/2005 | |
| JP | 200983267 | A | 4/2009 | |
| JP | 2011-94089 | A | 5/2011 | |
| JP | WO2017208837 | A1 | 3/2019 | |
| TW | 201920082 | A | 6/2019 | |
| WO | 2015002071 | A1 | 1/2015 | |
| WO | WO-2018016648 | A1 * | 1/2018 | ............. C07C 69/54 |
| WO | 2019188569 | A1 | 10/2019 | |

\* cited by examiner

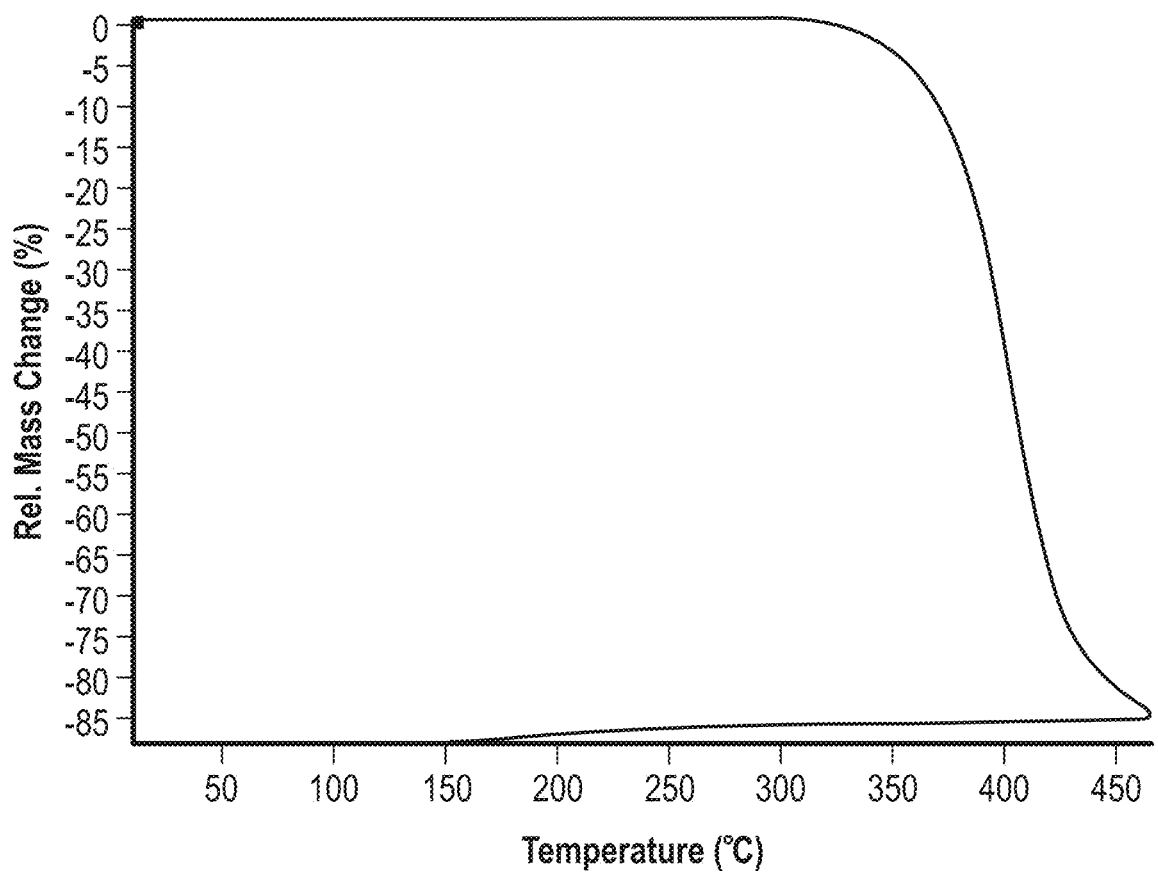

PHOTOCURABLE COMPOSITION

FIELD OF THE DISCLOSURE

The present disclosure relates to a photocurable composition, particularly to a photocurable composition for inkjet adaptive planarization including at least one 1,3-benzoxazine monomer and at least one acrylate monomer.

BACKGROUND

Inkjet Adaptive Planarization (IAP) is a process which planarizes a surface of a substrate, e.g., a wafer containing an electronic circuit, by jetting liquid drops of a curable composition on the surface of the substrate, and bringing a flat superstrate in direct contact with the added liquid to form a flat liquid layer. The flat liquid layer is typically solidified under UV light exposure, and after removal of the superstrate a planar surface is obtained which can be subjected to subsequent processing steps, for example baking, etching, and/or further deposition steps. There exists a need for improved IAP materials leading to planar cured layers with high thermal stability.

SUMMARY

In one embodiment, a curable composition can comprise a polymerizable material and a photo-initiator, wherein the polymerizable material can comprise at least one 1,3-benzoxazine monomer and at least one acrylate monomer, and wherein the composition may have a viscosity of not greater than 20 mPa·s.

In one aspect, the at least one 1,3-benzoxazine monomer can be a di-functional 1,3-benzoxazine monomer.

In another aspect, an amount of the 1,3-benzoxazine monomer can be at least 1 wt % based on the total weight of the polymerizable material and not greater than 30 wt %.

In a further certain aspect, the amount of the 1,3-benzoxazine monomer can be not greater than 15 wt % based on the total weight of the polymerizable material.

In yet another certain aspect, an amount of the 1,3-benzoxazine monomer can be not greater than 7 wt % based on the total weight of the polymerizable material.

In a further aspect, the viscosity of the composition may be not greater than 10 mPa·s.

In one embodiment, the polymerizable material can comprise the at least one 1,3-benzoxazine monomer and at least two acrylate monomers.

In one aspect, the at least two acrylate monomers can be selected from benzyl acrylate (BA), benzyl methacrylate (BMA), 1-naphthyl acrylate (1-NA), 1-naphthyl methacrylate (1-NMA), or bisphenol A dimethacrylate (BPADMA).

In a further aspect, a weight percent ratio of the at least one 1,3-benzoxazine monomer to the at least one acrylate monomer can be not greater than 1:5.

In yet another embodiment, the photocurable composition can be adapted for forming a cured layer, wherein the cured layer can have a weight loss during high temperature treatment from 260° C. to 320° C. at a heating rate of 10° C./min of not greater than 1.2%. In a certain aspect, the weight loss during high temperature treatment from 260° C. to 320° C. at a heating rate of 10° C./min may be not greater than 0.7%.

In another embodiment, a laminate can comprise a substrate and a photo-cured layer overlying the substrate, wherein the photo-cured layer can be formed from the above-described photocurable composition of the present disclosure.

In one aspect, the thickness of the photo-cured layer of the laminate may be at least 10 nanometers and not greater than 200 nanometers.

In a further aspect, the photo-cured layer of the laminate can have a weight loss during high temperature treatment from 260° C. to 320° C. at a heating rate of 10° C./min of not greater than 1.2%. In a certain aspect, the weight loss of the photo-cured layer of the laminate during the high temperature treatment may be not greater than 0.7%.

In one embodiment, a method of forming a photo-cured layer on a substrate can comprise: applying a photocurable composition on a substrate, wherein the photocurable composition comprises a polymerizable material and a photo-initiator, wherein the polymerizable material can comprise at least one 1,3-benzoxazine monomer and at least one acrylate monomer, and a viscosity of the photocurable composition may be not greater than 20 mPa·s; bringing the photocurable composition into contact with a superstrate; irradiating the photocurable composition with light to form a photo-cured layer; and removing the superstrate from the photo-cured layer.

In another aspect of the method, the cured layer can have a weight loss during high temperature treatment from 260° C. to 320° C. at a heating rate of 10° C./min of not greater than 1.2%.

In a further embodiment, a method of manufacturing an article can comprise: applying a photocurable composition on a substrate, wherein the photocurable composition can comprise a polymerizable material and a photo-initiator, wherein the polymerizable material can comprise at least one 1,3-benzoxazine monomer and at least one acrylate monomer, and a viscosity of the photocurable composition may be not greater than 20 mPa·s; bringing the photocurable composition into contact with a superstrate; irradiating the photocurable composition with light to form a photo-cured layer; removing the superstrate from the photo-cured layer; and processing the substrate with the photo-cured layer to make the article.

BRIEF DESCRIPTION OF THE DRAWINGS

Embodiments are illustrated by way of example and are not limited in the accompanying FIGURE.

FIG. 1 includes a graph illustrating the heat stability of a cured sample during high temperature heat treatment measured via thermographic analysis (TGA) according to one embodiment.

Skilled artisans appreciate that elements in the figures are illustrated for simplicity and clarity and have not necessarily been drawn to scale. For example, the dimensions of some of the elements in the FIGURES may be exaggerated relative to other elements to help improve understanding of embodiments of the invention.

DETAILED DESCRIPTION

The following description is provided to assist in understanding the teachings disclosed herein and will focus on specific implementations and embodiments of the teachings. This focus is provided to assist in describing the teachings and should not be interpreted as a limitation on the scope or applicability of the teachings.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in textbooks and other sources within the imprint and lithography arts.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus.

As used herein, and unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The present disclosure is directed to a photocurable composition comprising a polymerizable material and a photo-initiator, wherein the polymerizable material can comprise at least one 1,3-benzoxazine monomer and at least one acrylate monomer. The curable composition can have a viscosity of not greater than 20 mPa·s, and may be particularly suitable for use in inkjet adaptive planarization (IAP) for making planar cured layers having a high thermal stability.

In one embodiment, the 1,3-benzoxazine monomer can have the structure of formula (1):

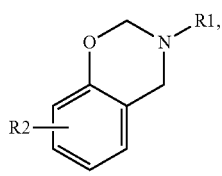

(1)

wherein R1 and R2 can be alkyl, substituted alkyl, aryl, substituted aryl, aryl-alkyl or substituted aryl-alkyl, and wherein aryl may contain heteroatoms, and the substitution can include single-bonded halogen, and at least one of R2 or all R2 can be hydrogen. The monomer of formula (1) can polymerize by ring-opening polymerization (opening of the oxazine ring).

In a particular aspect, the 1,3-benzoxazine monomer can be a di-functional benzoxazine monomer, wherein two 1,3-benzoxazine structures are combined. Non-limiting examples of di-functional benzoxazine monomers are illustrated in formula (2) and formula (3), wherein R3 and R4 can be C1-C10 alkyl, aryl, or aryl-alkyl (for example, dibenzyl methyl), and C5 and C6 may be the same or different and can include aryl, C1-C10 alkyl, or aryl-alkyl. In a particular embodiment, both R5 and R6 can be benzyl, and R3 and R4 may be C1 to C5 alkyl.

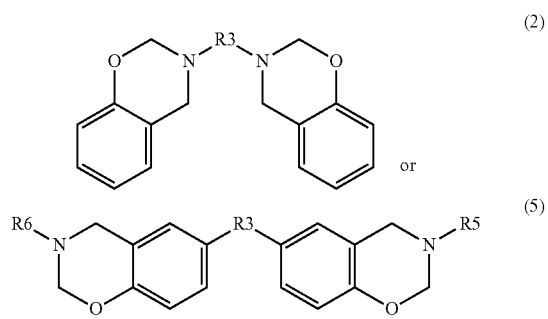

The at least one acrylate monomer of the polymerizable material can include mono-acrylates, di-acrylates or combinations thereof. As used herein, the term acrylate monomer relates to any monomer structure including an acrylate unit or substituted acrylate unit, for example a methacrylate unit. Non-limiting examples of acrylate monomers can be benzyl acrylate (BA); 1-naphthyl acrylate (1-NA); bisphenol A dimethacrylate (BPADMA); benzyl methacrylate (BMA); or 1-naphthyl methacrylate (1-NMA); or tetrahydrofurfuryl acrylate, isobornyl acrylate, or dicyclopentanyl acrylate, or pentafluorobenzyl acrylate, or 1-adamantyl Methacrylate, or 2-adamantyl acrylate, or trimethyl cyclohexyl acrylate. In one particular aspect, the composition can include at least two acrylate monomers selected from benzyl acrylate (BA), benzyl methacrylate (BMA), 1-naphthyl acrylate (1-NA), 1-naphthyl methacrylate (1-NMA), or bisphenol A dimethacrylate (BPADMA).

In another aspect, the polymerizable material can further include polymerizable monomers, oligomers, or polymers which are not benzoxazine monomers or acrylate monomers.

In one embodiment, the selection of the monomers contained in the polymerizable material can be made to obtain a low viscosity of the curable composition before curing. In one aspect, the viscosity of the curable composition can be not greater than 25 mPa·s, or not greater than 20 mPa·s, or not greater than 15 mPa·s, not greater than 12 mPa·s, not greater than 10 mPa·s, not greater than 9 mPa·s, or not greater than 8 mPa·s. In another aspect, the viscosity may be at least 2 mPa·s, such as at least 3 mPa·s, at least 4 mPa·s, or at least 5 mPa·s. In a particular aspect, the curable composition can have a viscosity of not greater than 10 mPa·s. As used herein, all viscosity values relate to viscosities measured at a temperature of 23° C. with the Brookfield method.

The amount of 1,3-benozoxazine monomer in the polymerizable material can be at least 1 wt % based on the total weight of the polymerizable material, or at least 3 wt %, or at least 5 wt %, or at least 10 wt %, or at least 15 wt %. In another aspect, the amount of 1,3-benzoxazine may be not greater than 30 wt %, or not greater than 25 wt %, or not greater than 20 wt %, or not greater than 15 wt %, or not greater than 10 wt %, or not greater than 7 wt %. Moreover, the amount of 1,3-benzoxazine can be within a range including any of the minimum and maximum values noted above.

In a further embodiment, the amount of the at least one acrylate monomer can be at least 50 wt % based on the total weight of the polymerizable material, such as at least 55 wt %, or at least 60 wt %, or at least 65 wt %, or at least 70 wt %, or at least 80 wt %, or at least 85 wt %, or at least 90 wt %. In another aspect, the amount of acrylate monomer may be not greater than 95 wt % based on the total weight of the polymerizable material, or not greater than 95 wt %, or not greater than 90 wt %, or not greater than 85 wt %, or not greater than 80 wt %, or not greater than 75 wt %, or not greater than 70 wt %. Moreover, the amount of the acrylate monomer can be within a range including any of the minimum and maximum values noted above.

In one aspect, a weight percent ratio of the at least one 1,3-polyoxazoline monomer to the at least one acrylate monomer can be not greater than 1:5, such as not greater than 1:6, or not greater than 1:8, or not greater than 1:10, or not greater than 1:12, or not greater than 1:15.

In yet a further embodiment, the amount of polymerizable material contained in the photocurable composition can be at least 75 wt % based on the total weight of the photocurable composition, such as at least 80 wt %, at least 85 wt %, at least 90 wt %, or at least 95 wt %. In another aspect, the amount of polymerizable material may be not greater than 99.5 wt %, such as not greater than 99 wt %, or not greater than 98 wt %, or not greater than 97 wt %, or not greater than 95 wt %, or not greater than 93 wt %, or not greater than 90 wt %. Moreover, the amount of polymerizable material can be within a range containing any of the minimum and maximum values noted above. In a particular aspect, the amount of polymerizable material can be at least 85 wt % and not greater than 98 wt % based on the total weight of the photocurable composition.

In a further aspect, the photocurable composition of the present disclosure may be free of a solvent, and the 1,3-benzoxazine monomer can be dissolved in the acrylate monomer.

In order to initiate the photocuring of the composition if exposed to light, one or more photo-initiators can be included in the photocurable composition.

In a certain aspect, the curing can be also conducted without the presence of a photo-initiator.

In another certain aspect, the curing can be conducted by a combination of light and heat curing, wherein the additional heat curing can improve the heat stability. In one particular aspect, the heat curing following the curing initiated by light can be at a temperature between 60° C. and 250° C. In a particular aspect, the heat curing can be conducted between 190° C. and 230° C.

In a further aspect, the photocurable composition can contain at least one optional additive. Non-limiting examples of optional additives can be a surfactant, a dispersant, a stabilizer, a co-solvent, an initiator, an inhibitor, a dye, or any combination thereof.

It has been surprisingly discovered that by selecting certain combinations of 1,3-benzoxazine monomer and acrylate monomers, photocurable compositions can be made having a desired low viscosity of less than 20 mPa·s and a high heat stability after curing. In one aspect, the photocurable composition can be adapted for forming a cured layer, such that the cured layer may have a weight loss during high temperature treatment from 260° C. to 320° C. at a heating rate of 10° C./min of not greater than 1.2%, such as not greater than 1.0%, or not greater than 0.8%, or not greater than 0.7%, or not greater than 0.5%, or not greater than 0.3%, or not greater than 0.1% based on the total weight of the cured layer.

In one embodiment, the cured layer can be part of a laminate, wherein the laminate can comprise a substrate and the cured layer is overlying the substrate. In a certain aspect, the laminate can further include one or more layers between the substrate and the cured layer, for example an adhesion layer.

The present disclosure is further directed to a method of forming a cured layer. The method can comprise applying the photocurable composition described above over a substrate; bringing the photocurable composition into contact with a superstrate; irradiating the photocurable composition with light to form the photo-cured layer; and removing the superstrate from the cured layer.

In one aspect, the light irradiation can be conducted with light having wavelength between 250 nm to 760 nm. In a preferred aspect, the light irradiation may be conducted with light having a wavelength between 320 nm and 450 nm.

The substrate and the solidified (cured) layer may be subjected to additional processing to form a desired article, for example, by including an etching process to transfer an image into the substrate that corresponds to the pattern in one or both of the solidified layer and/or patterned layers that are underneath the solidified layer. The substrate can be further subjected to known steps and processes for device (article) fabrication, including, for example, curing, oxidation, layer formation, deposition, doping, planarization, etching, formable material removal, dicing, bonding, and packaging, and the like. In a certain aspect, the substrate may be processed to produce a plurality of articles (devices).

The cured layer may be further used as an interlayer insulating film of a semiconductor device, such as LSI, system LSI, DRAM, SDRAM, RDRAM, or D-RDRAM, or as a resist film used in a semiconductor manufacturing process.

As further demonstrated in the examples, it has been surprisingly discovered that certain combinations of polymerizable 1,3-benzoxazine monomers and acrylate monomers in a photocurable composition can have very suitable properties especially for IAP processing. The photocurable composition of the present disclosure can have a desired low viscosity of not greater than 20 mPa·s and can form photo-cured layers having an exceptional high thermal stability up to 320° C.

EXAMPLES

The following non-limiting examples illustrate the concepts as described herein.

Example 1

Preparing of Photocurable IAP Compositions.

Four photocurable compositions (samples S1 to S4) were prepared by combining a di-functional benzoxazine (Bzn-F-a or Bzn-P-d from Sikoku), benzyl acrylate (BA), naphthylacrylate (NA) and bisphenyl A dimethacrylate (BPADMA). Each composition further contained 2.91 wt % of photo-initiator I G M Omnirad (former Irgacure 819), and 0.97 wt % surfactant (Chemguard 5554) based on the total weight of the composition. Benzoxazine Bzn-F-a has the chemical name 6,6'-Methylenebis[3,4-dihydro-3-phenyl-2H-1,3-benzoxazine, CAS #137836-80-7, and Benzoxazine Bzn-P-d has the chemical name 3,3'-(Methylenedi-4,1-phenylene)bis[3,4-dihydro-2H-1,3-benzoxazine, CAS #127959-98-2. Both Bzn-F-a and Bzn-P-d are solid materials which dissolved well in the liquid acrylate monomers.

The exact weight % amounts of each monomer type based on the total weight of the composition is shown in Table 1.

TABLE 1

| Sample | Benzoxazine [wt %] | BA [wt %] | 1-NA [wt %] | BPADMA [wt %] | Viscosity [mPa · s] |
|---|---|---|---|---|---|
| S1 | Bzn F-a 9.71 | 48.54 | 19.42 | 19.42 | 12.36 |
| S2 | Bzn P-d 9.71 | 48.54 | 19.42 | 19.42 | 12.36 |
| S3 | Bzn P-d 4.85 | 53.40 | 19.42 | 19.42 | 8.60 |
| S4 | Bzn P-d 14.56 | 43.69 | 19.42 | 19.42 | 19.83 |
| C1 | 0 | 48.54 | 29.13 | 19.42 | 8.25 |

The viscosities of the compositions S1 to S4 were all below 20 mPa·s, wherein viscosity differences from below 10 mPa·s (see sample S3) up to 19.83 mPa·s (see sample S4) were mainly caused by the amount of the 1,3-benzoxazine monomer.

Table 1 also includes a comparative sample C1, which did not contain a benzoxazine monomer in the polymerizable material, and is a commercial TAP resist material.

The curing was conducted after applying a liquid film of the photocurable composition of about 100 nm thickness on a glass substrate, and subjecting the liquid film to a UV light intensity of 25 mW/cm$^2$ and curing it for 80 seconds, which corresponds to a curing energy dosage of 2.4 J/cm$^2$.

After the curing, two heat treatments of the cured layers were conducted. The first heat treatment included heating at a speed of 10° K/min up to a temperature of 250° C., and holding the temperature at 250° C. for one hour.

The second heat treatment was conducted after the first heat treatment and cooling down to room temperature, by heating the samples again at a speed of 10° C./min, up to a temperature of 400° C., see also FIG. 1. For the second heat-treatment, the range especially between 260° C. and 320° C. was of specific interest, which is above the maximum temperature of the first heat treatment (250° C.) and short before the temperature wherein a large weight drop occurs because of the complete degradation of the polymer material.

Table 2 summarizes the weight loss of the samples S1-S3 and C1 after the two heat treatment regimes, measured via thermographic analysis (TGA). It can be seen that samples 51 to S3 were all highly stable during the second heat treatment, up to a temperature of 320° C., with a weight loss of even less than 0.7%. It was surprising that the high heat stability could be even observed with sample S3, which contained only about 5 wt % 1,3-benzoxazine monomer. In comparison, comparative sample C1, which did not include a 1,3-benzoxazine monomer had a weight loss of 1.41 weight percent. A representative TGA graph of the second heat treatment for sample S2 is further shown in FIG. 1, demonstrating the weight stability of the cured layer up to at least 320° C.

TABLE 2

| Sample | Weight loss during first heat treatment for 1 hour at 250° C. [%] | Weight loss during second heat treatment between 260-320° C. [%] |
|---|---|---|
| S1 (117) | 7.76 | 0.63 |
| S2 (118) | 7.9 | 1.01 |
| S3 (119) | 7.08 | 0.94 |
| C1 (IA-24) | 4.29 | 1.41 |

The viscosity of the samples was measured at 23° C., using a Brookfield Viscometer LVDV-II+Pro at 200 rpm, with a spindle size #18. For the viscosity testing, about 6-7 mL of sample liquid was added into the sample chamber, enough to cover the spindle head. For all viscosity testing, at least three measurements were conducted and an average value was calculated.

The TGA measurements were conducted using a Linseis STA 1000 machine under nitrogen atmosphere at a flow rate of 5-6 L/h and with a heating rate of 10° C./min.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A photocurable composition comprising a polymerizable material and a photo-initiator, wherein
the polymerizable material comprises at least one 1,3-benzoxazine monomer in an amount of at least 1 wt % and not greater than 30 wt % based on the total weight of the polymerizable material, and at least two acrylate monomers in an amount of at least 50 wt % based on the total weight of the polymerizable material;
an amount of the polymerizable material is at least 90 wt % based on the total weight of the photocurable composition;
the composition has a viscosity of not greater than 20 mPa·s at a temperature of 23° C.

2. The photocurable composition of claim 1, wherein the at least one 1,3-benzoxazine monomer is a di-functional 1,3-benzoxazine monomer.

3. The photocurable composition of claim 1, wherein an amount of the 1,3-benzoxazine monomer is not greater than 15 wt % based on the total weight of the polymerizable material.

4. The photocurable composition of claim 3, wherein an amount of the 1,3-benzoxazine monomer is not greater than 7 wt % based on the totals weight of the polymerizable material.

5. The photocurable composition of claim 1, wherein the viscosity of the composition is not greater than 10 mPa·s.

6. The photocurable composition of claim 1, wherein the at least two acrylate monomers are selected from benzyl acrylate (BA), benzyl methacrylate (BMA), 1-naphthyl acrylate (1-NA), 1-naphthyl methacrylate (1-NMA), or bisphenol A dimethacrylate (BPADMA).

7. The photocurable composition of claim 1, wherein a weight percent ratio of the at least one 1,3-benzoxazine monomer to the at least one acrylate monomer is not greater than 1:5.

8. The photocurable composition of claim 1, wherein the composition is adapted for forming a cured layer, the cured layer having a weight loss during high temperature treatment from 260° C. to 320° C. at a heating rate of 10° C./min of not greater than 1.2%.

9. The photocurable composition of claim 8, wherein the weight loss during high temperature treatment from 260° C. to 320° C. at a heating rate of 10° C./min is not greater than 0.7%.

10. A method of forming a photo-cured layer on a substrate, comprising:
applying a photocurable composition on a substrate, wherein the photocurable composition comprises a polymerizable material and a photo-initiator, wherein the polymerizable material comprises at least one 1,3-benzoxazine monomer in an amount of at least 1 wt % and not greater than 30 wt % based on the total weight of the polymerizable material, and at least two acrylate monomers in an amount of at least 50 wt % based on the total weight of the polymerizable material, an amount of the polymerizable material is at least 90 wt % based on the total weight of the photocurable composition, and a viscosity of the photocurable composition not greater than 15 mPa·s at a temperature of 23° C.;
bringing the photocurable composition into contact with a superstrate;
irradiating the photocurable composition with light to form a photo-cured layer; and
removing the superstrate from the photo-cured layer.

11. The method of claim 10, wherein the at least one 1,3-benzoxazine monomer is a di-functional benzoxazine monomer.

12. The method of claim 10, wherein an amount of the benzoxazine monomer is not greater than 15 wt % based on the total weight of the polymerizable material.

13. The method of claim 10, wherein the cured layer has a weight loss during high temperature treatment from 260° C. to 320° C. at a heating rate of 10° C./min of not greater than 1.2%.

14. A method of manufacturing an article, comprising:
applying a photocurable composition on a substrate, wherein the photocurable composition comprises a polymerizable material and a photo-initiator, wherein the polymerizable material comprises at least one 1,3-benzoxazine monomer in an amount of at least 1 wt % and not greater than 30 wt % based on the total weight of the polymerizable material, and at least two acrylate monomers in an amount of at least 50 wt % based on the total weight of the polymerizable material, an amount of the polymerizable material is at least 90 wt % based on the total weight of the photocurable composition, and a viscosity of the photocurable composition not greater than 20 mPa·s at a temperature of 23° C.;
bringing the photocurable composition into contact with a superstrate;
irradiating the photocurable composition with light to form a photo-cured layer;
removing the superstrate from the photo-cured layer; and
processing the substrate with the photo-cured layer to make the article.

* * * * *